Sept. 28, 1965   R. I. ODELL   3,208,359
AUTOMATIC SHUTOFF FOR SPREADER
Filed Aug. 8, 1960   2 Sheets-Sheet 1

INVENTOR.
ROBERT I. ODELL
BY
ATTORNEY

Sept. 28, 1965 R. I. ODELL 3,208,359
AUTOMATIC SHUTOFF FOR SPREADER
Filed Aug. 8, 1960 2 Sheets-Sheet 2

INVENTOR.
ROBERT I. ODELL
BY
ATTORNEY

United States Patent Office 3,208,359
Patented Sept. 28, 1965

3,208,359
AUTOMATIC SHUTOFF FOR SPREADER
Robert I. Odell, Mentor, Ohio, assignor, by mesne assignments, to Good Roads Machinery Corporation, Minerva, Ohio, a corporation of Ohio
Filed Aug. 8, 1960, Ser. No. 48,100
4 Claims. (Cl. 94—44)

This invention relates to improvements in a spreader and more particularly to an automatic shutoff means for a spreader.

Spreaders of this type are propelled by attaching them to the rear of a truck for towing by the truck. The truck has a dumping body in which the asphalt or other material to be spread is transported. This dumping body may be raised or lowered at the control of the truck driver so the material therein is dumped into the spreader's hopper.

Such spreaders are utilized to spread or lay asphalt, stone or the like, on parking lots, driveways, roadways etc. In most of these spreading operations, the length of the spread is normally short. These spreads are laid adjacent to one another and the number of spreads that is normally required for any one job is generally very large. When the end of one spread is reached, the spreader must be moved to the starting point of the new and next adjacent spread. This is accomplished by connecting the spreader to the truck's raised dump body and lowering the dump body to raise the spreader from the ground. The spreader then is transported in the suspended position to the starting point of the new spread merely by driving the truck to that point.

Heretofore, when the end of each spread was reached, it was necessary that the operator of the spreader accurately judge how much material would be required to reach the end of that particular spread. This he would do by instructing the truck driver when to discontinue the feeding of material from the truck's dump body into the spreader's hopper. If done correctly, the hopper of the spreader would be substantially empty at the end of each spread.

When the spreader was raised from the ground by the truck at the end of a spread, any material left in the spreader's hopper would fall through the bottom opening thereof into a pile on the ground. It was then necessary for this material on the ground to be manually shoveled back into the truck's dump body. Not only is this strenuous and time consuming labor, but if a heated material such as asphalt is being spread, it allows the asphalt in the truck and on the ground to cool.

In many instances the operator would misjudge the amount of material required to finish the spread, thus, requiring that large amounts of the material be shoveled back into the truck's dump body.

Invariably, the material on one side of the truck would flow into the hopper more rapidly than that in the other side of the truck. This required that the operator manually shovel the material from one side of the spreader to the other, thus, ensuring that an even spread be obtained at the end of each spread. If this were not done, the spreader's hopper would be full of material on one side and have none on the other after the flow of material from the truck to the spreader's hopper was discontinued.

To achieve the proper mating of the adjacent spreads of heated material, it is essential that they be laid as soon, timewise, as possible so there is no appreciable temperature differential in the material of the two adjacent spreads.

It is therefore the primary object of my invention to provide means on the spreader to eliminate this problem at the end of each spread.

It is another object of my invention to provide means for shutting off the bottom opening of the spreader's hopper.

It is a further object of my invention whereby the bottom opening of the spreader's hopper is automatically shut off prior to the spreader being raised from the ground by movement of the truck's dump body.

It is still another object of my invention to provide a method of closing the bottom of a spreader's hopper wherein the same power means and the same motion is used for closing the bottom of the spreader's hopper that is used to lift the spreader from the ground.

It is a still further object of my invention to provide means whereby the bottom opening of the spreader's hopper is maintained closed while the spreader is being transported by the truck.

It is another object of my invention to provide a shutoff for the bottom opening of the spreader's hopper which will be maintained closed until after the spreader has again been placed upon the ground.

Briefly, the embodiment of the present invention utilizes a shutoff plate which is hinged at the bottom of the spreader's hopper. The plate is movable between two positions. In one position, the bottom of the spreader's hopper is open to allow free flow of the material through it onto the ground surface. When moved to the second position, the shutoff plate closes the opening at the bottom of the spreader's hopper and prevents any material therein from flowing onto the ground surface.

The plate has cables connected to it and these cables serve as the operating means for the shutoff plate.

As described, the spreader is propelled along the surface of the ground behind the truck and the material is fed into the hopper from the raised dump body of the truck. To raise the spreader itself, a chain from the spreader is hooked onto the rear of the truck's dump body when it is in its raised position. The lowering of the dump body to its full down position raises the spreader off of the ground for transportation.

After the chain has been connected to the truck's dump body and prior to the lowering of the dump body, the cables are attached to the chains. This connection is made so the cables and the section of the chains between it and the truck's dump body are taut while the section of the chains from the cable connection to the spreader itself has slack in it.

The truck's dump body is then lowered. Its first effect is to pull on and move the cables. This swings the shutoff plate to the position where it closes the bottom of the hopper.

During this initial lowering of the dump body and the closing of the hopper's bottom opening, the slack is taken up in the chains and they become taut. Further lowering of the truck's dump body causes the rear of the spreader to be swung upwardly and pivoted about the rear axle of the truck, thereby raising the spreader and its runners off of the ground.

This motion continues until the truck's dump body has reached its full lowered position. The spreader is then completely off of the ground and suspended from the rear of the truck. It is seen that once the shutoff plate has closed the bottom of the hopper, the tautness in the cables and chains will continue to hold the shutoff plate in this position and the bottom of the spreader closed.

Because a loose connection normally exists between the spreader's hopper and runners, the cables that are connected to the shutoff plate also serve to raise the rear of the spreader's hopper and maintain it in its proper relation to the rest of the spreader. This prevents the spreader's hopper from tilting backwards while it is being lifted.

Other objects and features of my invention will become apparent when taken in connection with the following drawings in which.

The shutoff plate has been adapted for use on spreaders like the one shown and described in United States Letters Patent 2,914,995, which issued on December 1, 1959.

Figure 1:
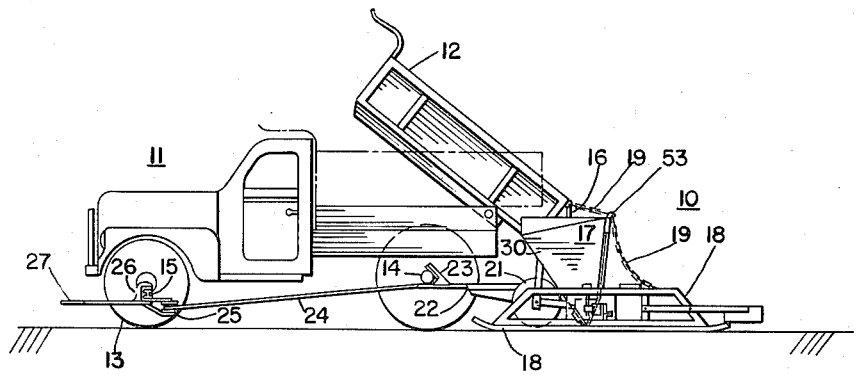
FIGURE 1 is a side elevational view of a dump truck with a spreader connected behind the truck in the material spreading position; the truck's dump body is shown in solid lines in its raised or dumping position and in dot-dash lines in its lowered or carrying position and with the chains connected to the truck's dump body when in its dumping position.

With reference to FIGURE 1, there is shown generally at 10 a spreader in its asphalt laying position. It is connected to the rear of a dump truck 11 so as to be drawn forward by the forward movement of truck 11. Truck 11 has a dump body 12 which is shown in its raised position by the solid lines and in its lowered position by the dot-dash lines. Asphalt or other bituminous material, stones, aggregate, slag or other type of material may be transported in dump body 12.

Truck 11 has wheels 13 serving as rolling support means mounted on a rear axle 14 and a front axle 15. Spreader 10 is hitched to these axes so that its hopper travels directly beneath the discharge openings, or tail gate 16, of dump body 12.

Spreader 10 comprises generally of a hopper 17 which is floatingly supported to a pair of runners 18—18 at either side thereof. Near the rear of each runner 18—18 is attached a chain 19 and 20, respectively. Chains 19 and 20 are of a length so they can be connected to the rear of dump body 12. Spreader 10 also has a pair of rollers 21—21 connected to the immediate front of hopper 17 and positioned to roll out the tire tracks of the propelling truck 11. For more specific details of runners 18—18, their connection to hopper 17 and the spreading operation of spreader 10, reference should be made to the said United States Letters Patent 2,914,995, issued on December 1, 1959.

Spreader 10 also has a hitching device consisting of a pair of arms 22—22 extending forward from hopper 17. At the forward end of each arm 22 is a V-shaped notch 23 which fits over and under rear axle 14. A cable 24, which is fixed at the rear of hopper 17 (not shown), extends through the arms 22—22 and out of the bottom leg of V-shaped notch 23. Cable 24 extends forward under the body of the truck and around a pulley 25 on a front axle hook 26. Front axle hook 26 is formed to fit over front axle 15. A handle 27 is connected to front axle hook 26 for the convenience of placing front axle hook 26 on front axle 15.

For more specific details and the method of attaching said spreader 10 to dump truck 11, reference should be made to United States Letters Patent 2,914,995, issued on December 1, 1959, and to the application entitled "Spreader Hitch," having Serial No. 854,738, which was filed on November 23, 1959.

Figure 2:
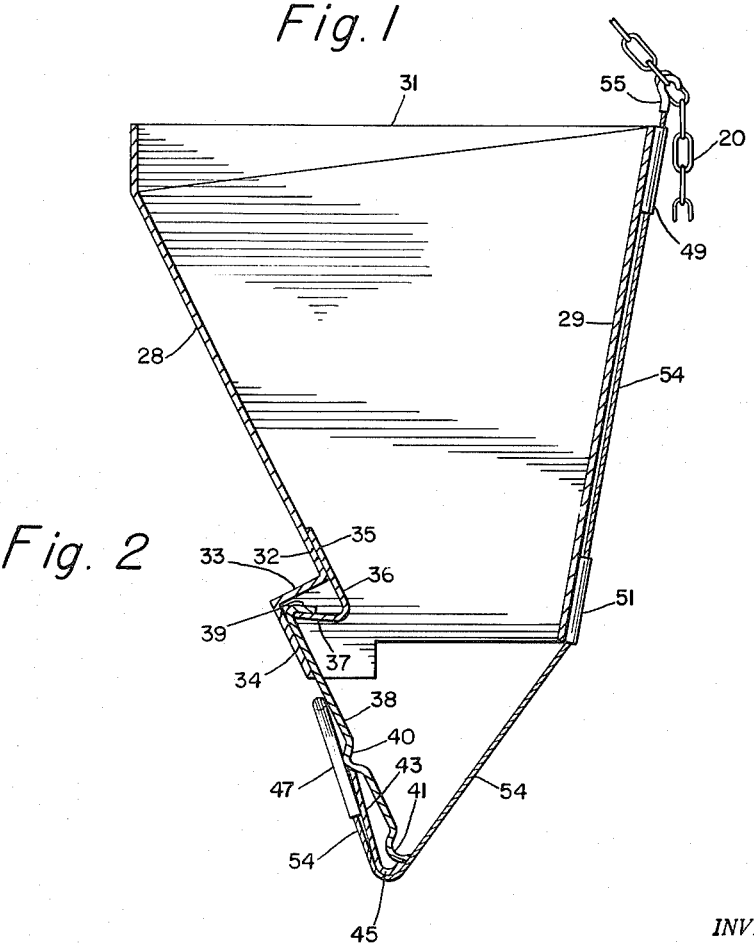
FIGURE 2 is a cross sectional view of the spreader's hopper, shown in an enlarged scale to illustrate the spreader's shutoff plate.

Hopper 17 is best shown in FIGURE 2 which shows the details of and means by which a shutoff plate 38 is attached to hopper 17. Hopper 17 consists of a front wall 28, a rear wall 29, and two side walls 30 and 31. Near the bottom of front wall 28, a forward Z-shaped bend is formed having a top leg 32, a connecting leg 33 and a bottom leg 34. This Z-shaped bend extends the full length of front wall 28.

Connected to front wall 28 immediately above the Z-shaped bend on top leg 32 by means of welding or screws (not shown) is a leg 35 of a hinge member 36. Hinge member 36 is generally V-shaped and positioned so its other leg 37 extends downwardly toward and terminates near bottom leg 34 of the Z-shaped bend. Hinge member 36 is of substantially the same length as front wall 28 and extends the full length thereof.

Shutoff plate 38 is formed from a substantially flat plate having a hook 39 formed at one end thereof. Hook 39 engages with and extends over the end of leg 37 of hinge member 36 to secure shutoff plate 38 in its proper position, yet allowing its hinged movement. When shutoff plate 38 is in its full opened position, it rests against the inside of bottom leg 34.

Grooves 40 and 41 are formed in shutoff plate 38 along its length for purposes of adding strength and rigidity to it.

Two deflector plates 42 and 43, each having a curvature formed at one end thereof 44 and 45, respectively, are attached beneath shutoff plate 38 in spaced apart relationship along its length and with curved ends 44 and 45 at the bottom edge of shutoff plate 38.

Tubular members 46 and 47 are secured beneath shutoff plate 38 and deflector plates 42 and 43, respectively.

Attached to the rear of rear wall 29 of hopper 17 and spaced along its length near its top are tubular members 48 and 49. Likewise, at the bottom rear of rear wall 29 are two additional tubular members 50 and 51. Tubular members 50 and 51 are likewise spaced along the length or rear wall 29.

The purpose of these tubular members are to contain and guide cables therethrough. A cable 52 having a hook 53 at one end thereof extends through tubular member 48, tubular member 50, under the bottom opening of hopper 17, over the curved end 44 of deflector plate 42 and into tubular member 50 where the other end of cable 52 is secured.

A second cable 54 having a hook 55 at one end thereof extends through tubular member 49, tubular member 51, under the bottom opening of hopper 17, over the curved end 45 of deflector plate 43 and extends into tubular member 47 where the other end of cable 54 is secured.

When it is desired to close the bottom of hopper 17, it is only necessary to pull upon the free or hooked ends of cables 52 and 54. Shutoff plate 38 is then swung upwardly hinged about leg 37 of hinge member 36 until it closes the bottom of hopper 17. Deflector plates 42 and 43 are positioned with their curved ends 44 and 45 at the outside edge of shutoff plate 38 so the pulling upon cables 52 and 54 will cause shutoff plate 38 to be swung inside of the bottom opening of hopper 17. This gives positive assurance that no material will be caught between shutoff plate 38 and the bottom edge of rear wall 29. If this were permitted, an opening or crack would be left between shutoff plate 38 and rear wall 29 so material in hopper 17 could flow therethrough onto the ground.

When it is desired to begin laying or spreading asphalt, truck 11 having asphalt in its dumping body 12 is connected to spreader 10 as shown in FIGURE 1. The truck driver opens tail gate 16 and raises dump body 12 so asphalt will flow from it into hopper 17. Truck 11 is then moved forward under its own motive power; and since it is connected to front axle 15 by front axle hook 26 through cable 24, spreader 10 is drug along the surface of the ground immediately under tail gate 16. The spreading of asphalt is accomplished as described in the aforedescribed patent.

When the end of a spread is reached, chains 19 and 20 are connected to each side of the rear of dump body 12 while it is in its fully raised position. Hook 53 on cable 52 is connected to chain 19 and hook 55 on cable 54 is connected to chain 20. Sufficient slack is left in the section of chains 19 and 20 behind the point where hooks 53 and 55 are connected. Cables 52 and 54 and the section of chains 19 and 20 that connect them to the dump body 12 are taut. Dump body 12 is then lowered by the truck operator.

As lowering takes place, it pulls on chains 19 and 20 and cables 52 and 54 so shutoff plate 38 is swung upward by the pull of the cables. This upward movement of shutoff plate 38 sweeps with it the asphalt laying beneath the bottom opening of hopper 17. This upward movement continues until shutoff plate 38 completely closes the bottom opening of hopper 17. During this movement, the slack in chains 19 and 20 behind the connection of cables 52 and 54 is taken up.

Figure 3:
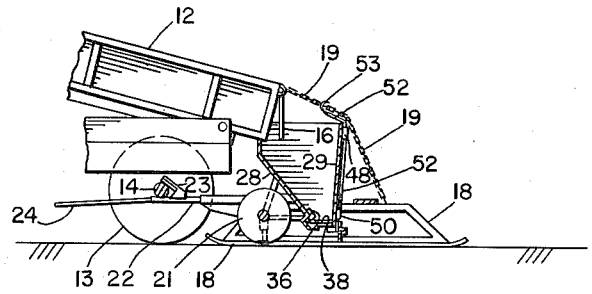
FIGURE 3 is a side elevational view like FIGURE 1, only showing the truck's dump body after it has been lowered to a point where the shutoff plate has been operated to close the bottom of the spreader's hopper and prior to the lifting of the spreader.

As shutoff plate closes the bottom opening of hopper 17, chains 19 and 20 become taut and dump body 12 still has further movement to make before it reaches its full lowered position. This is the position shown in FIGURE 3.

Further downward movement of dump body 12 now also pulls on chains 19 and 20 so that runners 18—18 and the entire spreader 10 is pivoted about rear axle 14 and raised from the ground. Cables 52 and 54 also remain taut and pull upward on the rear of hopper 17. If this were not done, hopper 17 would tend to tip backwards because of the floating connection between hopper 17 and runners 18—18.

Figure 4:
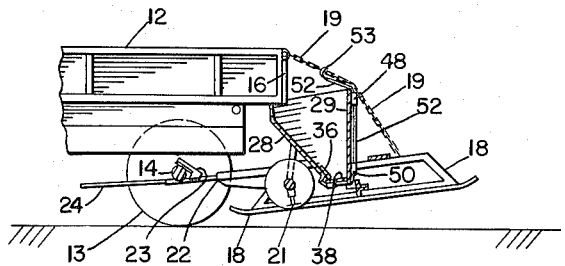
FIGURE 4 is a side elevational view like FIGURE 1, but showing the truck's dumping body in its full lowered position and the spreader in its elevated position for transportation.
Figure 5:
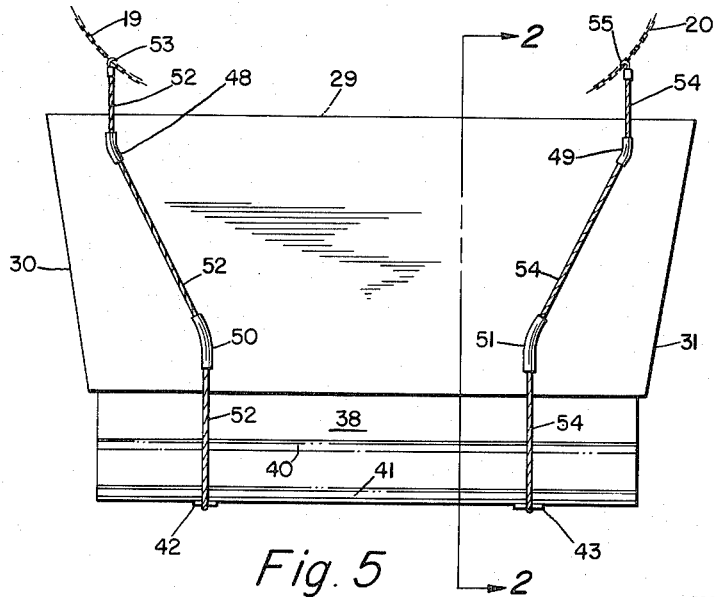
FIGURE 5 is a rear view of the spreader's hopper only, showing the connection between the cable and the hopper and the cable and the shutoff gate.

Dump body 12 continues to its full down position at which point spreader 10 is fully off of the ground and suspended at the rear of dump body 12 (see FIGURE 4). Truck 11 may now be maneuvered to its new position so a spread of asphalt can be laid adjacent to the one just completed. It is seen that all during the lifting of the spreader itself and during the transportation of the spreader to the new location, cables 52 and 54 are held taut. This prevents shutoff plate 38 from being accidentally opened by jarring or bumps while spreader 10 is being moved.

When truck 11 has reached the new position at which the new spread is to be started, dump body 12 is raised. The initial raising of dump body 12 lowers spreader 10 until runners 18—18 engage with the ground. Shutoff plate 38 is positively held in its closed position until after spreader 10 has been set upon the ground. After spreader 10 is on the ground, further raising of dump body 12 will allow shutoff plate 38 to swing downwardly under the weight of asphalt in hopper 17, opening the bottom of hopper 17. Chains 19 and 20 are then disconnected from dump body 12. Spreader 10 and truck 11 are now ready to lay the next spread of asphalt.

It is seen that shutoff plate 38 is operated with the minimum of interference or restriction to the opening at the bottom of hopper 17. The only restriction that shutoff plate 38 presents to the normal flow of asphalt or like material out of the bottom of hopper 17 is presented by cables 52 and 54 traversing across this opening.

It is further seen that by having shutoff plate 38 below the bottom opening of hopper 17 and arranged to swing upwardly to close said opening, a minimum amount of asphalt will remain upon the ground when shutoff plate 38 is closed prior to spreader 10 being lifted from the ground.

It is also to be noted that the closing or shutting off of the bottom opening of hopper 17 is accomplished with the same action or motion that is required for the lifting of spreader 10. This is of great importance because it does not entail the use of any additional power means and operations. Further, the closing of the bottom opening of hopper 17 and the lifting of spreader 10 is accomplished in the same amount of time that was previously required for the mere lifting of spreader 10.

While I have described my invention with regard to its application on a particular spreader design, it is apparent that such an automatic shutoff could be readily adapted for use on spreaders of other designs.

I claim:

1. A spreading means comprising a prime mover having a dumping body pivotally mounted at its rear and operable between a lowered material carrying and a raised material discharging position, a spreader including a hopper having a bottom opening and a gate for closing said opening, a first connecting means for connecting said spreader to the rear of said dumping body, and a second connecting means for connecting said gate to said first connecting means whereby upon the lowering of said dumping body from a raised material discharging position the gate moves to close the bottom opening by the initial lowering movement thereof and the spreader is raised by subsequent lowering movement thereof to a material carrying position.

2. A spreading means comprising: a prime mover having at least a rear axle and a dumping body for carrying material therein, said dumping body operable between a material carrying and a material discharging position; a spreader having a hopper with a top and bottom opening, and a gate beneath and hingedly connected near the bottom of said hopper, said gate normally in a position to maintain said bottom opening open and operable to close said bottom opening; hitching means for pivotally connecting said spreader to the rear axle of said prime mover and positioning the hopper to receive material from the dumping body when in the material discharging position; a first connecting means for connecting the spreader to the dumping body; a second connecting means for connecting the open gate to the first connecting means whereby upon the initial return movement of said dumping body to its material carrying position the gate is pivoted upwards to close the bottom opening by said first and second connecting means, and upon additional return movement towards the material carrying position the spreader is raised pivotally about the rear axle.

3. A spreading means comprising: a prime mover having at least a rear axle and a dumping body for carrying material therein, said dumping body operable between a material carrying and a material discharging position; a spreader having a hopper with a top and bottom opening, and a gate positioned beneath and hingedly connected near the bottom of said hopper, said gate normally in a position to maintain said bottom opening open and operable to close said bottom opening; hitching means for pivotally connecting said spreader to the rear axle of said prime mover and positioning the hopper to receive material from the dumping body when in the material discharging position; a connecting means for connecting the open gate to the dumping body whereby when said dumping body is initially moved towards the material carrying position the gate is pivoted upwards to close the bottom opening; another connecting means for connecting the spreader to the dumping body whereby upon additional movement of said dumping body to its material carrying position the second connecting means raises the spreader pivotally about said rear axle.

4. An elevatable spreader for asphalt and the like pulled by a truck having a pivoted dump body said spreader including a hopper having an open bottom, a gate for closing said bottom, hinge means fastening said gate adjacent one edge thereof to the hopper, and flexible fastening means attached to the gate remote from the hinge means to the dump body, whereby upon initial lowering of said dump body to its material carrying position the gate is pivoted upwards to close the bottom opening, and upon additional lowering movement towards the material carrying position the spreader is elevated to a transporting position.

References Cited by the Examiner

UNITED STATES PATENTS

| | | | |
|---|---|---|---|
| 1,501,205 | 7/24 | Dixon | 94—46 X |
| 2,162,353 | 6/39 | McVicker | 94—39 X |
| 2,260,433 | 10/41 | Cadwell | 222—505 |
| 2,586,396 | 2/52 | Trampler | 94—44 |
| 2,662,313 | 12/53 | Mowe et al. | 94—46 |
| 2,914,995 | 12/59 | Odell | 94—46 |

JACOB L. NACKENOFF, *Primary Examiner.*